Patented Nov. 18, 1952

2,618,620

UNITED STATES PATENT OFFICE 2,618,620

SOFTENING OF RUBBER

Arnold R. Davis, Riverside, Conn., and Bancroft W. Henderson, Montclair, N. J., assignors to American Cyanamid Company, New York, N. Y., a corporation of Maine No Drawing. Application June 28, 1946, Serial No. 680,094

4 Claims. (Cl. 260—29.7)

This invention relates to a novel method of producing plasticizable elastomeric compositions containing natural rubber or synthetic rubber-like copolymers and to the compositions so produced.

Most rubber and synthetic rubbers as they appear on the market are dry polymeric materials. They are obtained from natural or synthetic latex by coagulation of the solids with acid or salt and acid, alum, etc. and the like followed by washing and drying. In the manufacture of rubber goods therefrom, efficient processing, i. e., milling, calendering, extruding, molding and the like requires that the rubber or rubber-like composition be plasticized. This is necessary in order that production schedules can be met with fewer defective products and with reasonable charges for labor, power and equipment.

This plasticizing of rubber has been a costly procedure. As a result much time and effort has been expended in attempts to attain or approach more quickly, easily or economically the desired plasticity. The problem, which is a serious one even with natural rubber, is particularly troublesome with synthetic rubber-like copolymers of a conjugated diolefin and a compound containing a single olefinic linkage which is copolymerizable therewith since these newer elastomers are even more resistant to successful plasticizing.

One of the commonly practiced procedures in plasticizing rubber-like compositions is the use of chemical plasticizers or "peptizers." Development of this art is based on the discovery that small amounts of chemicals, such, for example, as some of the aromatic mercaptans and certain nitroso compounds, could be added to the rubber under various conditions to produce or approximate the desired effect. While the exact nature of the action of these materials is not completely understood, the development and practice of their use has come to be widely accepted.

In the past, incorporation of the chemical plasticizers into vulcanizable rubber and rubber-like materials has been done prior to compounding, i. e., prior to admixture with anti-oxidants, vulcanizing agents, fillers, extenders, reinforcing agents and the like, the compounding being done on an open mill, in a Banbury mixer or other suitable rubber masticating equipment. This has been done because the presence of certain compounding materials in the composition has an inhibiting effect on the action of the plasticizer.

Because of the successive treatments, the milling time was longer than is wholly desirable. In some cases this has been partially overcome by simultaneous plasticization and mixing processes in which the plasticizer is first added to the rubber or rubber-like material but is not fully incorporated before starting to add the other compounding ingredients. Those ingredients which retard the action of the plasticizer are added as late in the mixing schedule as possible. However, even these procedures have not resulted in milling schedules which are wholly satisfactory.

In the case of synthetic rubber-like materials the problem may be further complicated. For example, the commercially-available butadiene-styrene copolymers contain a stabilizer added in the process of manufacturing the copolymer to prevent oxidation in drying and storage, and perhaps also to prevent gel formation. The presence of this stabilizer is undoubtedly one of several factors which make the synthetic rubbers of this type more difficult to plasticize than natural rubber.

A demand still remains, therefore, for synthetic rubbers, particularly those such as the butadiene-styrene copolymers, and even natural rubber in more highly desirable form in which they can be more readily plasticized with the equipment now available in commercial use.

Attempts have been made in the past to obtain such rubber or rubber-like materials by incorporating the plasticizer in the latex prior to the coagulation, washing and drying of the polymeric material. The available plasticizers, however, proved objectionable from several standpoints. Some are water-soluble so that they were largely washed out in the washing operation following coagulation. Others have been volatile or toxic.

Nevertheless, the latex incorporation procedure appears highly desirable. If successful, readily plasticizable rubber compositions could be made available for direct feed to the mill. This would have at least two important advantages. It would decrease the amounts of plasticizer required and in addition the necessary milling time would be appreciably reduced. Again, this would be particularly useful in the processing of such recalcitrant materials as the synthetic acrylonitrile-butadiene and styrene-butadiene copolymers.

It is, therefore, the principal object of the present invention to devise a procedure whereby plasticizable but otherwise uncompounded rubber compositions can be prepared. It is a further object to develop suitable plasticizing agents and a method for their use which will result in obtaining these highly desirable results by simple, duplicable and reliable methods.

In general, the desired objects of the present invention are accomplished by incorporating in a natural or synthetic latex a novel type of plasticizer. In general these plasticizers comprise o,o'-diacylaminodiphenyl disulfides of the general formula

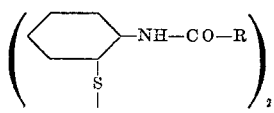

where R is an alkyl or aryl radical containing from about 1 to 12 carbon atoms. R may be, for example, a methyl, ethyl, butyl, cyclohexyl, octyl, lauryl, phenyl, tolyl, xylyl, naphthyl or the like radical. Where R is an alkyl group it is preferably saturated, the crotonamido derivative, for example, being much less effective than either the butyramido or isobutyramido derivatives. Large molecules such as palmitamido and stearamido derivatives appear to have too great a dilution effect for satisfactory use. For general use the methyl, ethyl, butyl and phenyl derivatives are all highly satisfactory, the latter being one of the most active. The structure and arrangement of the composition appears to be quite specific. Varying the structure from the ortho,ortho' derivative to the meta,meta' or para,para' derivatives results in useless compositions.

Use of the plasticizer in accordance with the present invention is relatively simple. Being insoluble in water, the o,o'-diacylaminodiphenyl disulfide is dispersed in water and this dispersion is added directly to the latex. The latter may be a natural or synthetic latex of natural rubber or a synthetic rubber-like copolymer of a conjugated diolefin and a compound copolymerizable therewith containing a single olefinic linkage. Perhaps the best method of preparing the plasticizer dispersion is to combine the plasticizer with about an equal amount of water and mill the mixture together. A dispersing or wetting agent may be added if so desired to increase both the degree and permanency of the dispersion. A number of commercially available materials are suitable for the purpose. One suitable agent for this purpose is a short chain alkyl naphthalene sodium sulfonate condensed with formaldehyde.

After admixing the latex and plasticizer dispersion, the rubber or rubber-like copolymer is coagulated in the conventional way with acids, salts or mixtures of them, alum and the like. The coagulated rubber is then washed and dried. The dried material may be fed directly to the mixer or mill. Contrary to previous experience with such procedures the plasticizer is taken up by the rubber in uniform distribution, is not washed out and is highly effective when so incorporated.

The amounts of plasticizer used may actually be lower than previously found necessary for incorporation on the mill. The requirements, however, will vary with the particular rubber being treated. Natural rubber requires much less plasticizer than do the synthetic copolymers. In general amounts varying from about 0.05 to 1.0% of plasticizer are effective with natural rubbers whereas from about 0.5 to about 5.0% are required for butadiene-acrylonitrile copolymers and from about 0.5 to 3.0% are required for styrene-butadiene copolymers.

Practice of the present invention has a number of advantages. The necessary amount of both plasticizer and anti-oxidant may be effectively reduced if desired. This is an advantage with both natural and synthetic rubbers. Further, the necessary milling time in obtaining the final compounded rubber is greatly reduced with both natural and synthetic rubbers. This is commercially very important, especially with the compositions of the butadiene-styrene copolymer types which are notoriously slow working.

There is also an added advantage apparent in the case of synthetic latices. The plasticizing agent may be added to the emulsion in which copolymerization has been carried out. In the past the degree of copolymerization has been limited by the difficulty in masticating and softening the resultant copolymer during the manufacturing operation. When the plasticizer is added to the latex, copolymerization may be carried to an increased degree without obtaining products which cannot be satisfactorily milled.

The invention will be illustrated in conjunction with the following examples which are to be taken as illustrative only and not by way of limitation. All parts are by weight unless otherwise noted.

EXAMPLE 1

A plasticizer dispersion was prepared by ball milling a mixture of 50 parts of o,o'-dibenzamidodiphenyl disulfide and 48 parts of water containing 2 parts of Daxad No. 11 until a smooth paste was formed. This dispersion was used in the following examples.

EXAMPLE 2

800 parts of natural rubber latex containing 31.5% solids were coagulated with acetic acid, washed and dried. This comprised sample A. Sample B was obtained by combining an additional 800 parts of latex and 2.5 parts of the o,o'-dibenzamidodiphenyl disulfide dispersion prepared as noted above. The plasticizer dispersion was incorporated by stirring and the latex then coagulated with acetic acid, washed and dried. Sample B contained about 0.5% plasticizer based on the total latex solids. Sample C was prepared by incorporating 0.625 part of the plasticizer dispersion in a third 800 parts of latex amounting to about 0.125% of plasticizer based on the total latex solids. Sample C was also coagulated, washed and dried. Plasticity of the samples was estimated by measuring the Williams 3 minute (Y) value at 100° C. on samples before milling and after 6 minutes of milling in a Banbury mixer. The results are shown in Table I.

*Table I*

| Williams 3 Minute "Y" Value at 100° C. | Sample A | Sample B | Sample C |
|---|---|---|---|
| | Mils | Mils | Mils |
| Not Milled | 216 | 205 | 215 |
| Milled 6 minutes in Banbury (Rotors—212° F., Stator 307° F.) | 134 | 49 | 88 |

It will be seen, therefore, that contrary to previous experience the plasticizer is effectively combined with the elastomer during coagulation, is not lost during washing and is efficiently operative when combined with the elastomer before adding any further compounding ingredients.

EXAMPLE 3

To illustrate the effectiveness of the present invention with synthetic rubber-like copolymers, to 1300 parts of GR–S latex, type II, was added 5.5 parts of phenylbetanaphthylamine dispersed in water with 0.22 part of Daxad No. 11 giving a total weight of 1369 parts. This was divided into two portions. To the first no plasticizer was added. To the second 5.5 parts (equivalent to 1.5% of plasticizer on GR-S solids) of the plasticizer dispersion prepared as noted above was added with stirring. Both portions of latex were coagulated with salt and acid, washed and dried. As in Example 1 the Williams "Y" value was determined before milling and after 6 minutes milling in a Banbury mixer. The effectiveness of the plasticizing action is shown in the following table.

Table II

| Williams 3 Minute "Y" Value at 100° C. (mils) | Sample A | Sample B |
|---|---|---|
| Not Milled | 130 | 123 |
| Milled 6 minutes in Banbury (Rotors—212° F., Stator 307° F.) | 116 | 83 |

EXAMPLE 4

A number of 965 part samples of a GR–S latex, type II (26% solids) were respectively combined with the following materials:

Sample A—3.75 parts of phenyl beta naphthyl amine and 0.15 part of Daxad No. 11 as an aqueous dispersion Sample B—1.875 parts of phenyl beta naphthyl amine and 0.75 part of Daxad No. 11 as an aqueous dispersion and 7.5 parts of the dispersion of Example 1 (equivalent to 1.5% of plasticizer on GR–S solids)

Sample C—1.875 parts of phenyl beta naphthyl amine and 0.75 part of Daxad No. 11 as an aqueous dispersion and 5.0 parts of the plasticizer dispersion of Example 1 (equivalent to 1.0% of the plasticizer on GR–S solids)

Sample D—5.0 parts of the plasticizer dispersion of Example 1 (equivalent to 1.0% of the plasticizer on GR–S solids)

These four mixtures were coagulated with alum, washed and dried. The Williams "Y" value was determined before and after milling for 6 minutes in a Banbury mixer. The effectiveness of the plasticizing action is shown in the following table:

Table III

| Williams 3 Minute "Y" Value at 100° C. | Sample A | Sample B | Sample C | Sample D |
|---|---|---|---|---|
| Before milling (mils) | 131 | 130 | 127 | 124 |
| Milled 6 minutes in Banbury (Rotors—212° F., Stator— 307° F.) (mils) | 125 | 98 | 101 | 93 |

We claim:
1. An anti-oxidant free latex comprising from 88 to 99.9 parts of an elastomer selected from the group consisting of natural rubber and rubber-like copolymers of a butadiene 1,3 and styrene and a butadiene 1,3 and acrylonitrile having uniformly disseminated therein from 0.05 to 5.0 parts of a plasticizer comprising an o,o'-diacylamino diphenyl disulfide of the formula

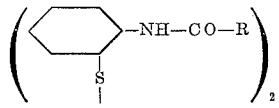

wherein R is selected from the group consisting of the alkyl radicals of 2 to 12 carbon atoms and the aryl radicals of 6 to 12 carbon atoms.

2. A composition according to claim 1 in which the elastomer is a natural rubber and the plasticizer is present in amounts of from about 0.05 to 1.0 parts per hundred parts by weight of the elastomer.

3. A composition according to claim 1 in which the elastomer is a butadiene-1,3-acrylonitrile copolymer and the plasticizer is present in amounts of from about 0.5 to about 5.0 parts per hundred parts by weight of the elastomer solids.

4. A composition according to claim 1 in which the elastomer is a butadiene-1,3-styrene copolymer and the plasticizer is present in amounts of about 0.5 to 3.0 parts per hundred parts by weight of the elastomer solids.

ARNOLD R. DAVIS.
BANCROFT W. HENDERSON.

REFERENCES CITED

The following references are of record in the file of this patent:

UNITED STATES PATENTS

| Number | Name | Date |
|---|---|---|
| 2,339,033 | Sibley | Jan. 11, 1944 |
| 2,470,945 | Paul | May 24, 1949 |

OTHER REFERENCES

The Rubber Age: "Latex compounding of GR–S," by H. F. O'Connor et al., vol. 54, No. 5, Feb. 1944, pages 423–427.